Jan. 12, 1943.   W. A. ANDERSON   2,308,144
ACCOUNTING MACHINE
Filed Dec. 31, 1937   8 Sheets-Sheet 1

INVENTOR
WALTER A. ANDERSON
BY
L. G. Julihn
ATTORNEY

Jan. 12, 1943.　　　W. A. ANDERSON　　　2,308,144
ACCOUNTING MACHINE
Filed Dec. 31, 1937　　　8 Sheets-Sheet 2

INVENTOR
WALTER A. ANDERSON
BY
L. G. Julihn
ATTORNEY

Jan. 12, 1943.                W. A. ANDERSON                   2,308,144
                              ACCOUNTING MACHINE
                            Filed Dec. 31, 1937            8 Sheets-Sheet 3
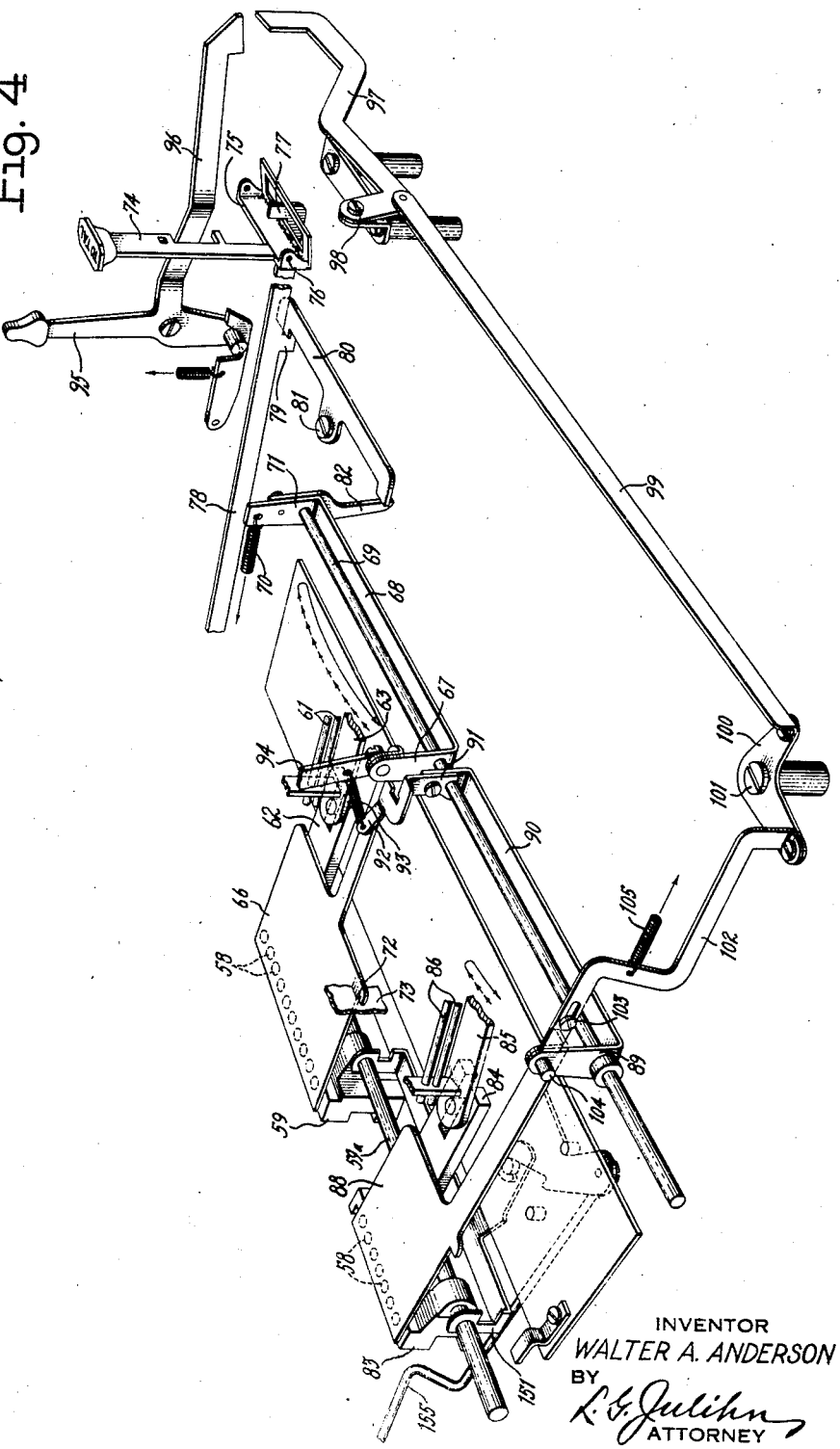
INVENTOR
WALTER A. ANDERSON
BY
L. F. Julihn
ATTORNEY Jan. 12, 1943.　　　W. A. ANDERSON　　　2,308,144
ACCOUNTING MACHINE
Filed Dec. 31, 1937　　　8 Sheets-Sheet 4
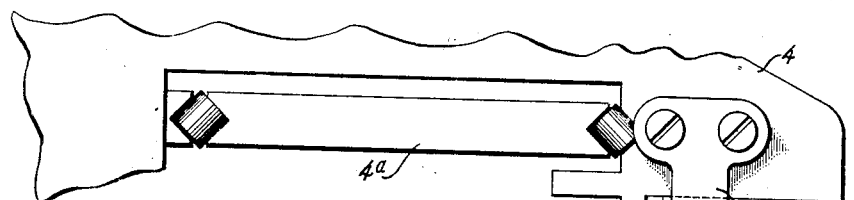
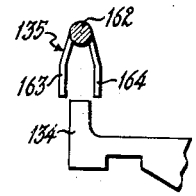
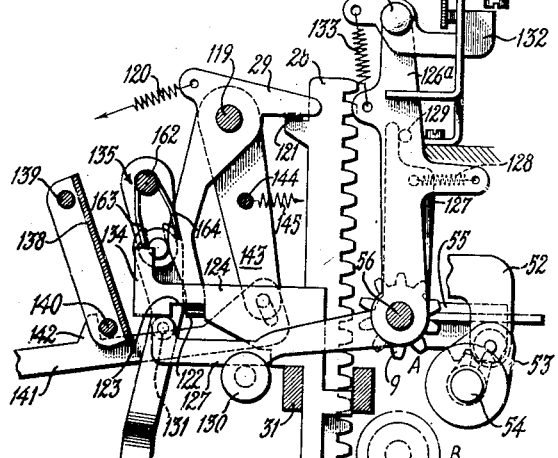
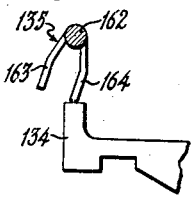
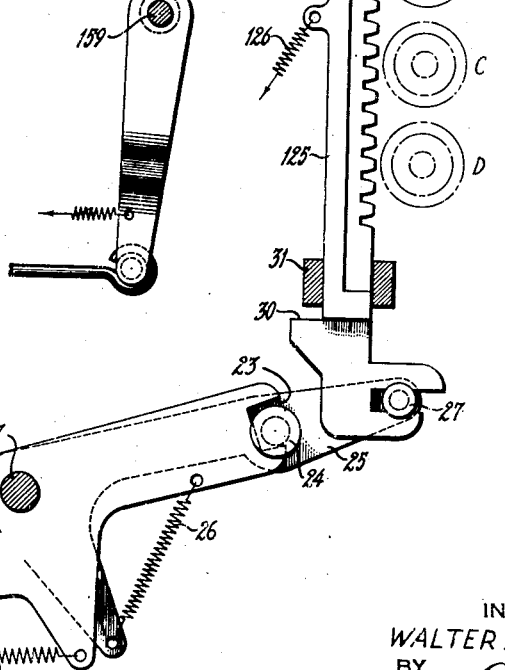
INVENTOR
WALTER A. ANDERSON
BY
ATTORNEY Jan. 12, 1943.  W. A. ANDERSON  2,308,144
ACCOUNTING MACHINE
Filed Dec. 31, 1937   8 Sheets-Sheet 5

INVENTOR
WALTER A. ANDERSON
BY
L. G. Julihn
ATTORNEY

Jan. 12, 1943.　　　W. A. ANDERSON　　　2,308,144
ACCOUNTING MACHINE
Filed Dec. 31, 1937　　　8 Sheets-Sheet 6
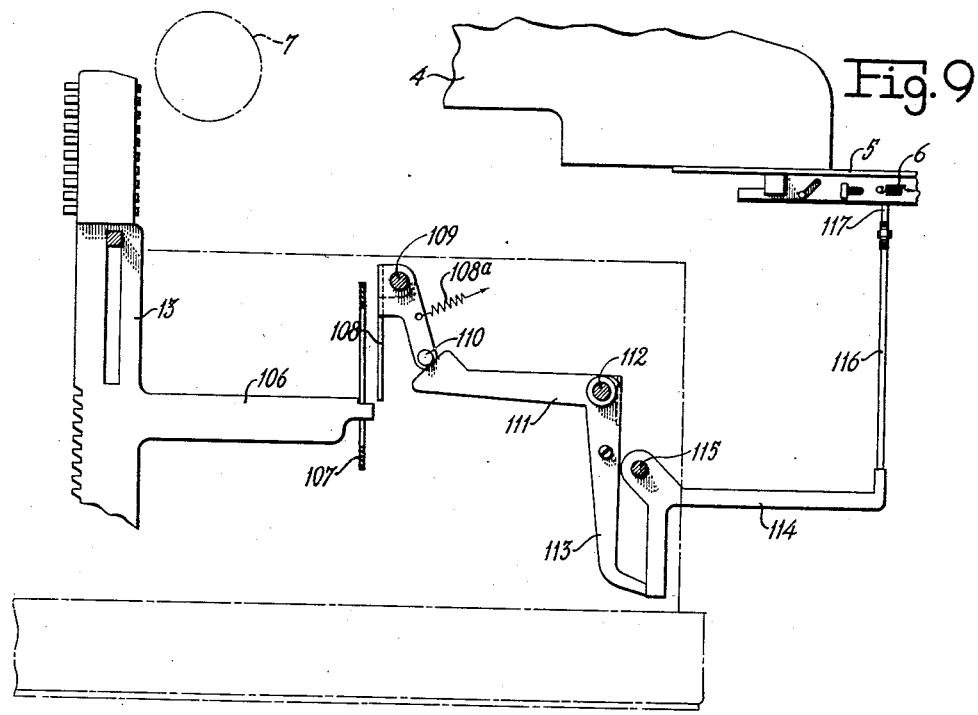
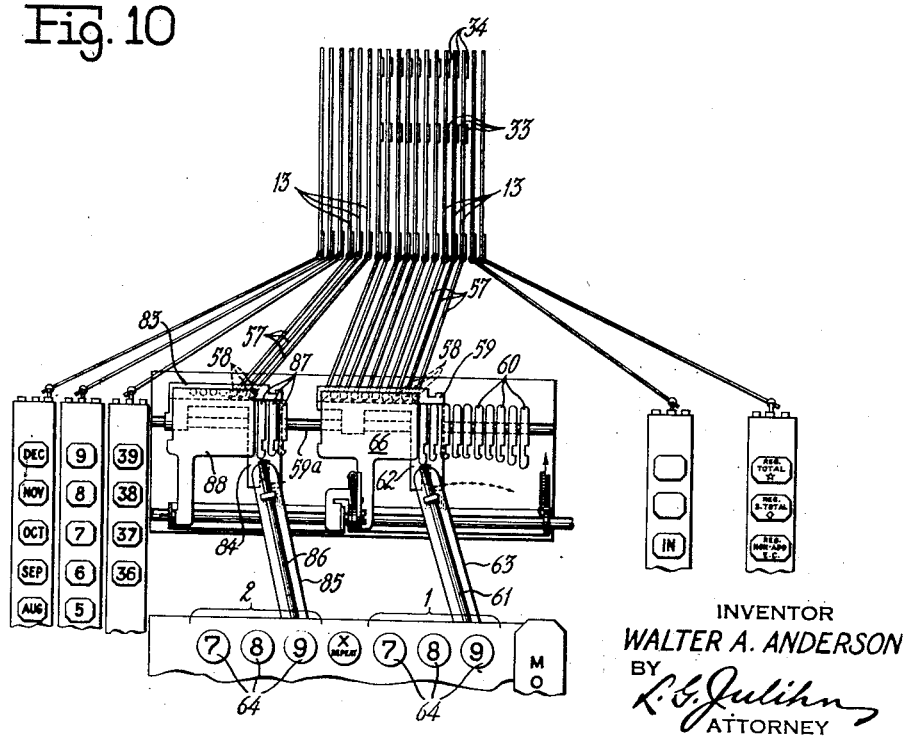
INVENTOR
WALTER A. ANDERSON
BY
*L. G. Julihn*
ATTORNEY Jan. 12, 1943.   W. A. ANDERSON   2,308,144
ACCOUNTING MACHINE
Filed Dec. 31, 1937   8 Sheets-Sheet 7
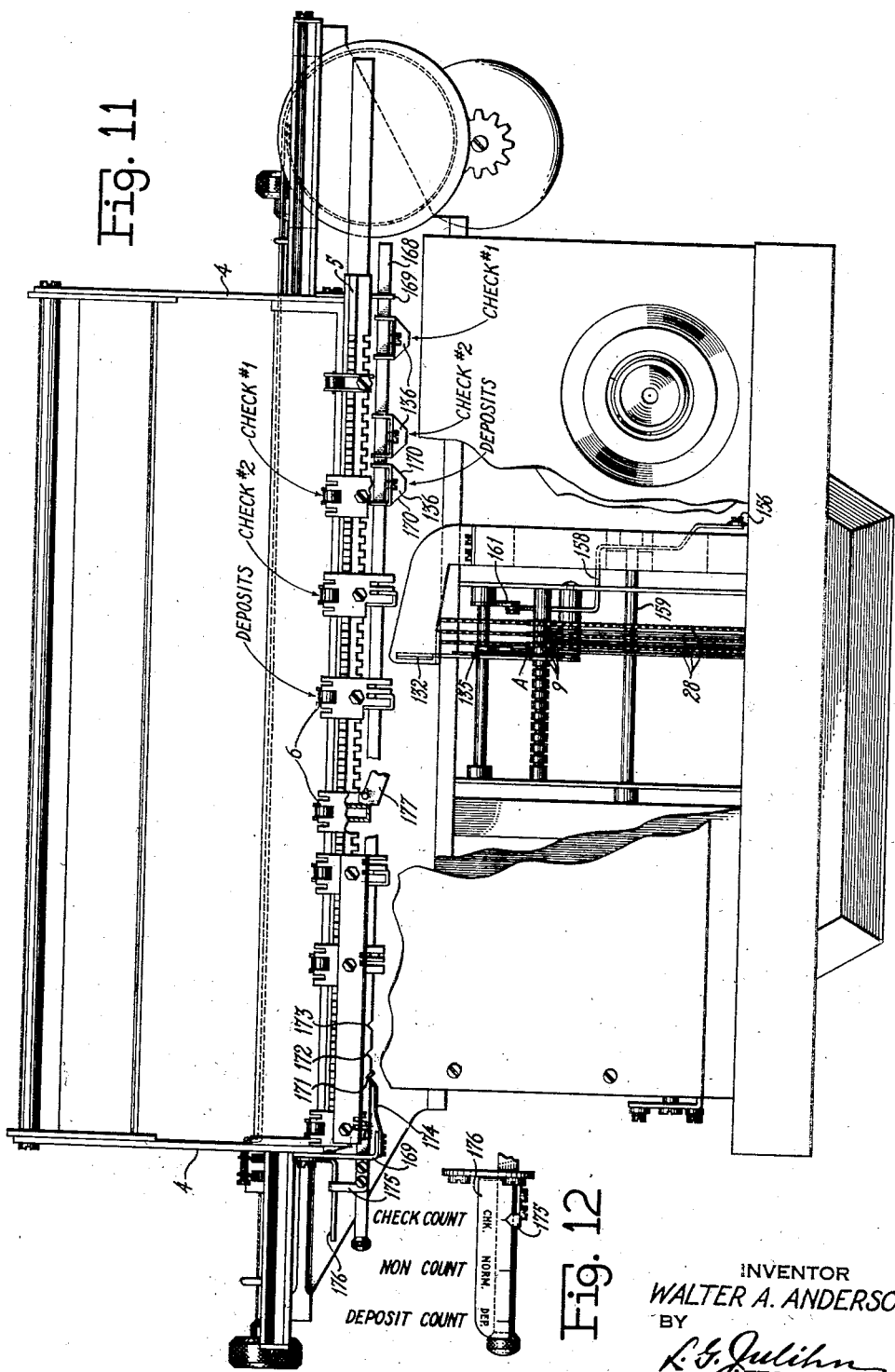
INVENTOR
WALTER A. ANDERSON
BY
ATTORNEY Jan. 12, 1943.  W. A. ANDERSON  2,308,144
ACCOUNTING MACHINE
Filed Dec. 31, 1937  8 Sheets-Sheet 8

INVENTOR
WALTER A. ANDERSON
BY
L. G. Julihn
ATTORNEY

Patented Jan. 12, 1943

2,308,144

UNITED STATES PATENT OFFICE 2,308,144

ACCOUNTING MACHINE

Walter A. Anderson, Bridgeport, Conn., assignor to Underwood Elliott Fisher Company, New York, N. Y., a corporation of Delaware Application December 31, 1937, Serial No. 182,681

4 Claims. (Cl. 235—60)

This invention relates to accounting machines, and more particularly to the type of machine used for posting patrons' accounts in banking houses, although the invention is not limited to machines of this particular type of work.

In bank posting operations it is desirable to have a record of the total number of items (deposit or check entries) on each patron's account, this number being used to compute the charge made to the patron for handling his account. Some banks confine their charges to either the checks or deposits handled, while others charge for both.

In posting accounts that have a large number of items for a single day's posting, it is the practice to find the total value of these items, together with their total number, on an ordinary adding machine, so that the operator can post this group of items as a single posting operation rather than as individual items.

It is therefore an object of the present invention to provide an accounting machine which may be readily adjusted to count and record the number of either deposits or checks posted.

Another object is to provide a counter in which a number larger than "1" may be entered when the operator posts the amount of a group of items in one operation.

With these and incidental objects in view, the invention consists in certain novel features of construction and combinations of parts, the essential elements of which are set forth in appended claims, and a preferred embodiment of which is hereinafter described with reference to the drawings which accompany and form part of the specification.

In the drawings:

Figure 1 is a perspective view of an accounting machine embodying the invention, Figure 2 is a diagrammatic view of the keyboard, Figure 3 is a right side elevation of the machine showing the actuating mechanism and parts of the item counter, Figure 4 is a perspective view of certain of the parts under the control of a key, for preventing the taking of totals from the item counter when totals are taken from the registers, Figure 5 is a right side elevation of the item counting device with the parts shown in mid-cycle position, Figure 6 is a detail view of a control device for the counter, shown in position to permit the counting of "1", Figure 7 is a view similar to Figure 6 with the control device in its position for preventing the counting of "1", Figure 8 is a perspective view showing the train of elements used for moving the control device, Figure 9 is a right side elevation of a modified form of the device shown in Figure 4, Figure 10 is a diagrammatic plan view of the type carrier connections to the keyboard mechanism, Figure 11 is a rear elevation of the accounting machine with certain parts broken away to show the location of the counting device, Figure 12 is a detail plan view of an indicator for showing whether the machine is set to count checks or deposits, Figure 13 shows a sample statement sheet with a running total of the number of checks appearing thereon, and Figure 14 shows a sample ledger sheet with a running total of the number of deposits appearing thereon.

GENERAL DESCRIPTION

This machine is an improvement on the co-pending application of Oscar J. Sundstrand, Serial No. 581,800, filed December 18, 1931, (now Patent 2,194,270) and on my co-pending applications Serial Nos. 64,641 (now Patent 2,177,817) and 92,164, filed February 19, 1936, and July 23, 1936, respectively, and includes a keyboard having two sets of amount keys, date setting keys and totalizer and printer controlling keys. It has a traveling paper carriage automatically adjustable to a series of columnar positions, together with return mechanism operable automatically at a predetermined point in the carriage travel. The carriage includes a control plate carrying a series of magazines with control lugs for automatically controlling the numerous operations that are controlled manually by the keyboard. The carriage illustrated in the drawings is of the combined front and rear feed type. The machine includes four adding registers and one cross-footer, the uppermost of said registers being arranged to count items, and hereafter referred to as the item counter. Three of the registers and the crossfooter are actuated by a common set of actuators adjustable under control of stops set by the right hand set of amount keys. The counter is arranged to be actuated by an independent set of actuators under the control of stops set by the left hand set of amount keys. These actuators also control the adjustment of type for printing amounts and totals from the registers, crossfooter and item counter. The three adding registers together have one set of transfer elements, while the item counter and crossfooter have separate sets. The transfer element in the units order of the item counter is controlled to normally add "1" into the counter when an item is indexed by the right hand amount keys and the machine operated, and is prevented from adding "1" when an item indexed by the right hand keys is accompanied by an item being indexed by the left hand keys and the machine operated. A manipulative device on the paper carriage is provided to enable the operator to adjust the item counter controls so that either deposits or checks may be counted. Selection of the adding registers is performed by depression of one of three keys on the right side of the keyboard, and selection of the counter is determined by selection of the crossfooter. Totals are taken from the adding registers by depressing the proper selecting keys, operating the machine through a blank cycle, then depressing the register total key and again operating the machine. Subtotals are taken from the adding registers in the same manner as totals, except that the register sub-total key is depressed instead of the total key.

Register totals may be automatically taken at the end of a day's work. This is initiated by a lever, which, in one position, conditions the registers in predetermined columnar positions for accumulating certain classes of postings, and when moved to another position, conditions the registers for automatically totaling such posted amounts successively from their respective registers upon a proof sheet. Connections between the lever and the type bars for the item counter are arranged to prevent printing from these type bars when totals are taken from the registers.

The crossfooter is arranged to be normally engaged with its actuators, and, as stated above, the counter being controlled therewith, is likewise engaged with its racks when the machine is in normal position. A subtract key is provided for the purpose of engaging the crossfooter for subtraction. If it is desired to subtract in the crossfooter, it is merely necessary for the operator to index the amount by the right hand amount keys, depress the subtract key and cycle the machine. To take totals from the crossfooter, the operator takes a blank cycle, then depresses the crossfooter total or sub-total key and operates the machine through one more cycle.

The selection of registers, crossfooter and counter, subtraction in the crossfooter, the taking of totals, cycling of the machine, paper feeding and other machine functions may be controlled automatically by the traveling carriage in its several columnar positions.

DETAILED DESCRIPTION

INDEX OF TOPICS

1. The machine sections and general actuating mechanism.
2. Actuation of registers and crossfooter generally.
3. Engaging of crossfooter and item counter.
4. Amount indexing and printing by right hand amount keys.
5. Amount indexing and printing by left hand amount keys.
6. Preventing movement of item counter type bars during register total operations.
7. Carriage controlled means for preventing movement of item counter type bars during register total operations.
8. Automatic entry of "1" in item counter.
9. Keyboard control of entry of "1" in item counter.
10. Disabling the automatic entry of "1" when a number is entered in the item counter by amount keys.
11. Carriage control of entry of "1" in item counter.
12. Counting checks or deposits selectively.
13. Non-printing of item count.
14. Examples of work.

1. The machine sections and general actuating mechanism

Figure 1:
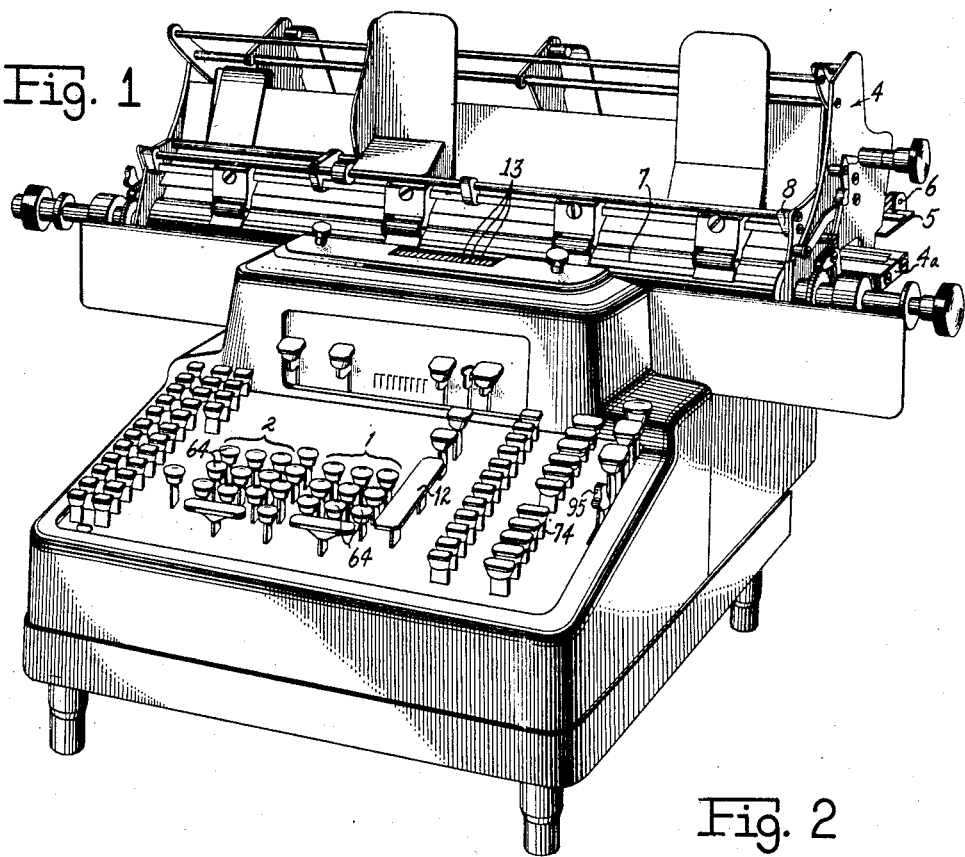
Figure 2:
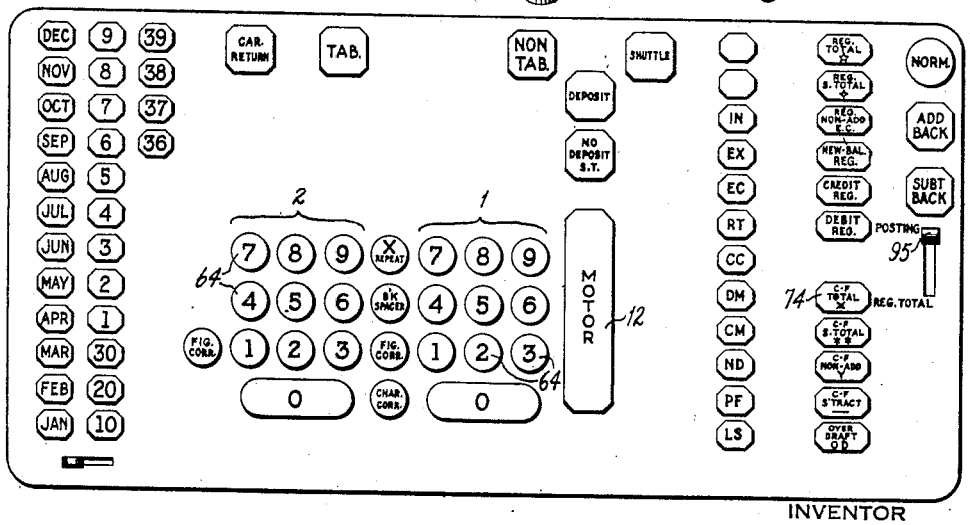

Referring to Figure 1, the machine includes two sets of amount keys 1 and 2, the right and left, respectively, type bars 13 for printing on work sheets, a laterally movable paper carriage indicated generally at 4 mounted on a track 4ª, and a control plate 5 mounted on the paper carriage and having a plurality of control magazines 6 for automatically controlling the operations of the machine in predetermined columnar positions. The carriage is provided with the customary roller platen 7 for the insertion of work sheets at the rear thereof, and a bail structure 8 for use in connection with other sheets fed from in front of the platen. The machine also includes (Figure 3) the item counter designated generally as A, and three adding registers designated generally as B, C and D. Each of these accumulators comprises a plurality of ten toothed wheels 9, operable for adding only. Situated in front of these registers is an adding and subtracting crossfooter indicated generally at E, and having a plurality of twenty toothed wheels 10.

The machine is actuated by an electric motor (not shown). The motor is started by the closing of a suitable switch mechanism and is coupled with an actuating shaft 11 by a suitable clutch mechanism upon depression of a motor bar 12 (Figure 1). The actuating shaft is connected with the motor drive in such a manner that the shaft is rocked, first counterclockwise and then clockwise, about ninety degrees during each operation of the machine.

The manual means for controlling such functions as selection of the registers, subtraction, non-addition, total taking and sub-total taking, are located at the right hand side of the keyboard (Figure 1). The mechanism for performing these various operations is fully disclosed in application Serial No. 581,800.

2. Actuation of registers and crossfooter generally

Actuation of the registers and crossfooter is controlled by a plurality of identical type bars 13 (Figure 3), arranged for vertical movement. The lower ends of the type bars are each provided with a slotted arm 14, embracing a stud 15 on the forward end of levers 16 pivoted on a rod 17. Strong springs 18 are attached to levers 16 and to the machine frame, and tend to rotate the levers clockwise. The levers are normally restrained against such movement by their forward arms bearing against a rod 19 extending between spaced, identical cam levers 20 pivoted on rod 17. These cam levers, in turn, are restrained by resting against corresponding rollers 21 on corresponding identical spaced arms 22, secured to actuating shaft 11, the shaft being normally restrained against movement, as disclosed in my application Serial No. 581,800, making the above-described mechanism normally held in the position shown in Figure 3.

The rear end of each lever is provided with a recess 23 in which lies a stud 24, there being an increment of lost motion between the parts. Stud 24 is secured to a lever 25 also pivoted on rod 17. Springs 26 extend between lower arms of levers 25 and the rear arms of levers 16. This spring tension causes studs 24 to be urged toward the upper end of recess 23. Studs 27 are secured to the rear end of levers 25 and lie within slots in the lower end of vertically movable racks 28. The racks are normally held against movement upward from their position shown in Figure 3 by bell cranks 29 of the transfer mechanism. As explained in my application Serial No. 581,800, when a transfer occurs between two denominational orders, the rack 28 affected is released for an additional step of movement, which causes the rack to be raised to a position where a shoulder 30 thereon contacts a guide bar 31, and where stud 24 lies in the upper end of recess 23. However, since the transfer mechanism for these registers is identical with that in my application Serial No. 581,800, we need not be concerned with this additional step of movement or with the relative movement between levers 16 and 25 except as it applies to the counting register A, as will hereinafter appear.

When the machine is operated, roller 21 moves counter-clockwise about actuating shaft 11, allowing strong springs 18 to raise type bars 13 and lower racks 28. The amount of movement imparted to the type bars and the racks is controlled by the amount entered in the keyboards in a manner to be later described. Suffice it to say here that continued movement of roller 21 raises cam levers 20, without an accompanying movement of levers 16 and the other parts, after the type bars are arrested.

During the first portion of the return movement of roller 21, it rides along a dwell portion of cam levers 20 to give the selected register an opportunity to become engaged with racks 28 before they return to their raised positions. The ensuing return movement of the racks during the remainder of the return movement of roller 21 rotates wheels 9 of the engaged register to add thereon the amount indexed.

The actuation of the crossfooter E is likewise controlled by type bars 13. A rearwardly extending arm 32, formed on each of the type bars 13, carries a pair of depending racks 33 and 34 lying on opposite sides of the crossfooter wheels 10 and arranged for vertical movement therewith. Racks 33 are used for subtracting, and racks 34 for adding.

At the beginning of a cycle, the wheels 10 are disengaged from the racks. Then the type bars 13 rise, carrying the racks upward with them an amount corresponding to the amount indexed. The parts occupy this position during the remainder of the counter-clockwise movement of actuator arm 22. As explained above in connection with the actuation of the registers, the first portion of the return stroke of arm 22 is accompanied by no movement of the type bars 13 because of the dwell portion on lever 20. During this period the crossfooter is re-engaged with the racks so that subsequent downward movement of the racks actuates wheels 10. The wheels remain engaged with the racks at the end of the operation. The details of the crossfooter, together with its engaging and transfer mechanisms, are fully disclosed in the Sundstrand application Serial No. 581,800. The engagement of the item counter A, however, is under the control of the crossfooter engaging mechanism. The following brief description of this mechanism is therefore given.

3. Engaging of crossfooter and item counter

Figure 3:
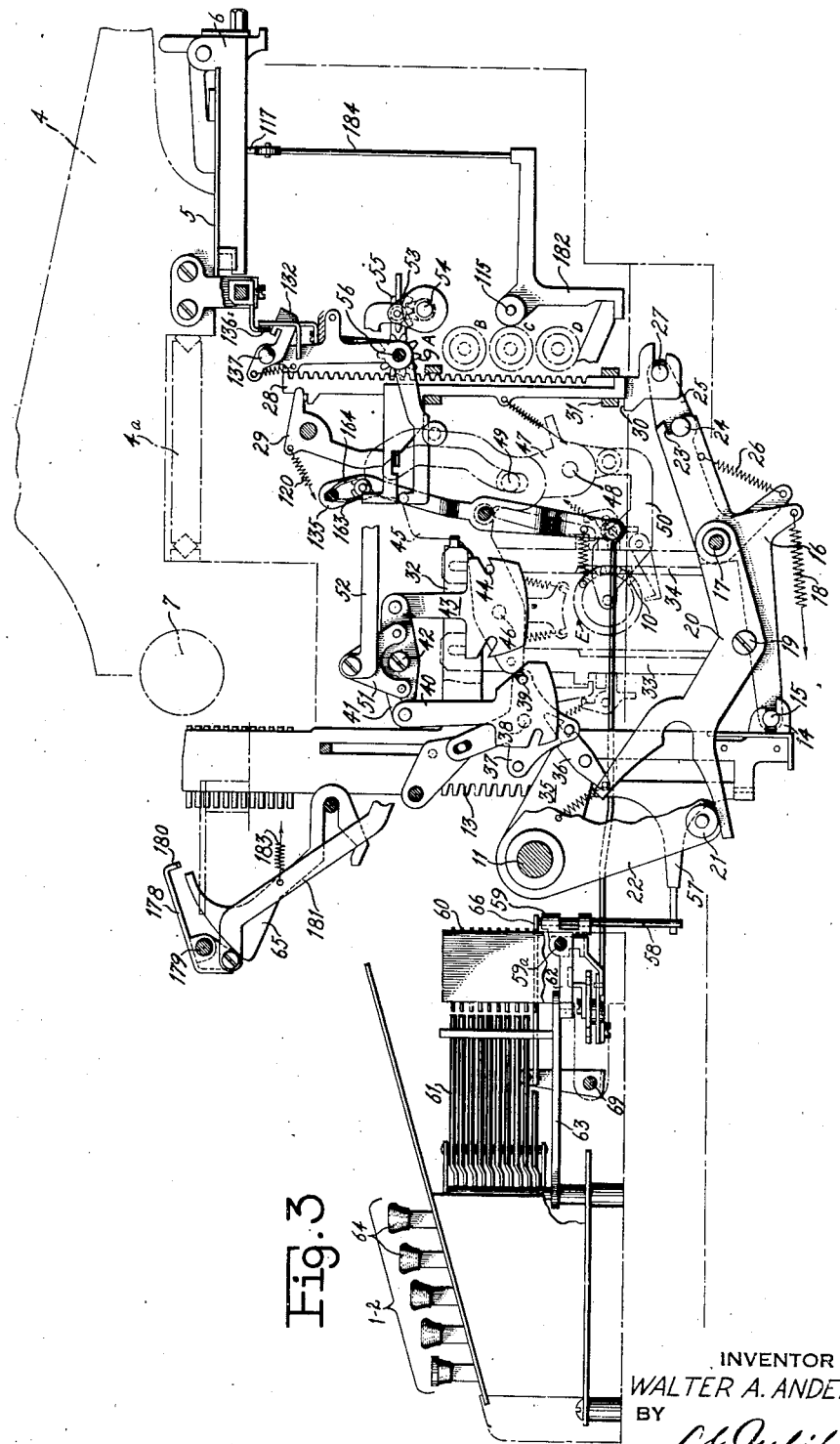

Referring to Figure 3, an actuating arm 35 is secured to the actuating shaft 11, and has a pawl 36 arranged to oscillate a plate 37 pivoted on a stud 38, first counter-clockwise, then clockwise during every cycle of the machine. A stud 39 on plate 37 is embraced by a notch in the rear edge of a pendant 40 pivoted at its upper end to rocker 41 pivoted on a stationary rod 42. Another pendant 43 is pivoted to the rear end of rocker 41 and has a notch in its rear edge embracing a stud 44 on a cam lever 45 pivoted on a stationary rod 46. A lever 47 is pivoted at 48 in the machine frame and is provided at its upper end with a roller 49 lying within a slot in the cam lever 45. The lower end of lever 47 is pivotally connected to a pitman 50, the opposite end of which is connected directly to the crossfooter shaft.

When the machine is operated, the initial counter-clockwise movement of plate 37 at the beginning of the cycle raises pendant 40, rocking rocker 41 clockwise, and lowering pendant 43 and cam lever 45 to substantially a horizontal position wherein roller 49 lies in the middle portion of the cam slot. This movement causes lever 47 to oscillate sufficiently to move the crossfooter equidistant between the two sets of racks 33 and 34. As plate 37 oscillates clockwise about pivot 38 at the beginning of the return stroke, the above-mentioned parts move back to their normal position shown in Figure 3. An upwardly extending bracket 51, fixed to the rocker 41, has pivoted thereto a horizontally disposed pitman 52, the rear end of which is povotally connected to an arm 53 (see also Figure 5) fixed on the outer end of a shaft 54 journaled in the machine frame. A pair of teeth on shaft 54 mesh with corresponding teeth on a slidable frame 55. The wheels 9 of the item counter A are rotatably mounted on a shaft 56 supported in the frame 55. By the foregoing parts, it is apparent that at the beginning of a machine cycle, as rocker 41 rocks clockwise, arm 53 rocks clockwise a short distance, withdrawing the counter from engagement with the adding racks 28, and as the reverse movement of these parts is effected by counter-clockwise movement of rocker 41 at the beginning of the down stroke of arm 35, the counter re-engages with racks 28 simultaneously with the engagement of the crossfooter with the racks 33 or 34. Thus, as the crossfooter is disengaged and engaged, the item counter is simultaneously disengaged and engaged.

4. Amount indexing and printing by right hand amount key

The group of type bars 13 associated with the amount keys 1 (Figure 10) are provided with forwardly extending arms 57 pivoted to the lower ends of the type bars (Figure 3). The forward ends of these arms 57 carry upstanding pins 58 arranged to be guided for vertical movement through openings in a transversely movable slide 59, mounted on a stationary rod 59a. Pins 58 lie just behind a series of stops 60 and are normally positioned to the left thereof, as shown in Figure 10. The stops 60 are arranged to be set, i. e., moved into the vertical path of the pins 58, by depression of the amount keys 64. Depression of a key 64 thrusts a rod 61 (Figure 3) rearwardly, setting that stop which corresponds to the digit indexed by the depression of the key. The slide 59 is provided with a forwardly extending projection 62 having a pin and slot connection with a swinging bracket 63 (see also Figure 4) in which the rods 61 are slidably mounted. Through an escapement mechanism (not shown) associated with the slide 59, bracket 63, and keys 64, indexing of a number by the amount keys, as above described, allows slide 59, bracket 63 and pins 58 to move step by step toward the right, as viewed in Figure 10, one step for each digit indexed, and thus move pins 58 under the rear ends of the stops 60 set by the amount keys. Hence, as the machine is cycled following the indexing of an amount, and the type bars 13 (Figure 3) rise, pins 58 strike against the differentially set stops 60, in which position corresponding type characters in the upper ends of the type bars are brought into printing alignment with the platen 7. Shortly after this, impression hammers 65 are tripped and the amount is printed. During the last half of the cycle, type bars 13 are restored as described in the foregoing, and rods 61 and stops 60 are restored to their normal positions shown in Figure 10. Any type bars 13 not used in printing this number are prevented from rising by a detent plate 66 (see also Figure 4). The plate 66 is guided for forward and rearward horizontal movement in the machine frame, the forward end thereof being pivoted to an upstanding arm 67 of a bail 68 pivoted on a stationary transverse rod 69. A spring 70 secured to the opposite upstanding arm 71 of bail 68 tensions the bail and plate 66 rearwardly so that a shoulder 72 on the plate abuts a portion 73 of the machine frame. In this position, the rear edge of the plate overlies such of the pins 58 as were not moved from under the plate when the number was indexed, and thereby prevents the upward movement of the actuators connected with these pins.

In total taking operations it is necessary to withdraw this plate from above the pins 58 in order to permit the type bars 13 to rise and print the amount of the total which has been accumulated in the selected totalizer.

Referring now to Figure 4, the lower end of a total key 74 rests upon the upper edge of a cradle 75 pivoted as at 76. An upstanding lug 77 of a total control slide 78 lies in front of cradle 75. A depending lug 79 formed on the lower edge of slide 78 lies in back of one end of a lever 80 pivoted at 81 and having its opposite end resting against a downwardly extending projection 82 secured to the arm 71 of bail 68. Hence, depression of total key 74 withdraws plate 66 from above pins 58 against the tension of spring 70. While the particular slide 78 shown in this illustration is under control of the crossfooter total key, it will be understood that the crossfooter sub-total, register total and register sub-total key slides are each provided with a lug corresponding to lug 79, and therefore, operation, either manual or under control of the traveling carriage, of these slides will cause the withdrawal of plate 66 as described.

For a more detailed understanding of the indexing and printing mechanisms, reference should be made to application Serial No. 581,800.

5. Amount indexing and printing by left hand amount keys

The type bars 13 associated with the item counter A are controlled from the left hand amount keys 2 (see Figure 10) and are provided with arms 57 and pins 58 similar to the corresponding parts for the amount keys 1. These pins 58 are guided at their upper ends by openings provided in a slide 83 similar to slide 59 and likewise slidably mounted on rod 59a. Slide 83 is provided with a forwardly extending projection 84 having a pin and slot connection with a swinging bracket 85 in which slidable push rods 86, corresponding to rods 61, are mounted. The rods 86 are arranged to set stops 87 (Figure 10) similar to stops 60. This indexing mechanism is also provided with escapement mechanism and restoring devices similar to those provided for the indexing mechanism for amount keys 1. By these parts, a number indexed by the amount keys 2 is entered in the item counter A in exactly the same manner as amounts are entered in the other accumulators by the amount keys 1. A detent plate 88 corresponding to plate 66 is arranged to normally overlie any pins 58 which are not moved from under the plate when an amount is indexed. This plate 88 is pivoted to an upstanding arm 89 of a bail 90 pivoted on rod 69. The opposite upstanding arm 91 of this bail has secured thereto a rearwardly extending finger 92 to which is secured a spring 93 connected at its opposite end to an upstanding projection 94 on arm 67 of bail 68. Thus, as bail 68 is rocked clockwise by movement of any of the total slides such as 78, bail 90 is simultaneously rocked clockwise to withdraw detent 88 from above pins 58. This allows the type bars associated with both sets of amount keys to rise simultaneously during a total taking operation, making it possible to take a total from both the item counter and crossfooter in one cycle of the machine.

6. Preventing movement of item counter type bars during register total operations A mechanism is provided whereby, upon completion of a day's postings of various accounts, the operator may, by shifting a lever 95 (Figure 1) from "posting" to "register total" position, take the totals of the checks, deposits and new balances upon a proof sheet (see Figures 13 and 14). This mechanism and its operation is fully shown and described in application Serial No. 92,164. Since, during the taking of these totals from the B, C and D registers, it is desired to prevent the type bars associated with the item counter from rising and printing, the following mechanism is provided. The lever 95 (Figure 4) has a forwardly extending arm 96 overlying the outer end of a lever 97 pivoted on the machine frame at 98. A link 99 is pivoted to lever 97 and to a bell crank 100 pivoted at 101 on the machine frame. The opposite arm of bell crank 100 is pivoted to a slide 102 guided for sliding movement upon a screw 103 passing through a slot in the slide and secured on the machine frame. The rear end of slide 102 lies in the path of a stud 104 on arm 89 of bail 90. A spring 105 connected between the slide and the machine frame normally tensions the slide forwardly and thereby holds the associated parts 100, 99 and 97 in the position shown in Figure 4. Movement of lever 95 from its posting position shown in Figure 4, forwardly to its register total position rocks arm 96 downwardly on lever 97, whereupon link 99 rotates bell crank 100 clockwise and pushes slide 102 rearwardly against the tension of spring 105. Such movement causes slide 102 to abut stud 104. Therefore, when a register total key is depressed, pulling its slide, similar to 79, forward to withdraw the detent plates 66 and 88, detent 88 is maintained in its rear position over its pins 58, against the tension of spring 93. The type bars associated with the item counter are thereby prevented from rising during the taking of totals from the registers. When lever 95 is moved back to its posting position, slide 102, bell crank 100, link 99, and lever 97 are restored to normal position under the tension of spring 105.

7. Carriage controlled means for preventing movement of item counter type bars during register total operations A modified form of the means for holding the type bars 13, associated with the item counter A, in their normal position during register total taking operations is shown in Figure 9. The type bars 13 associated with the item counter are provided with rearwardly extending arms 106 (Figure 9) guided in a slotted plate 107, through which the rear ends of the arms extend. A detent plate 108 is pivotally mounted upon a rod 109 secured in the machine frame and tensioned counter-clockwise by a spring 108$^a$. A depending arm formed on this plate carries a stud 110 which rests against a beveled edge on a lever 111 pivoted on a rod 112. A downwardly extending arm 113 of this lever rests against a depending arm of a lever 114 pivoted on a stationary rod 115. The lever 114 is arranged to be actuated by a pin 116 resting thereon and guided for vertical movement in the machine frame. Pin 116 is arranged to be depressed by control lugs placed in magazines 6 mounted on the control plate 5 of the traveling carriage in those columnar positions where register totals are taken. As the carriage moves into those positions, a lug such as 117 depresses pin 116 and rocks levers 114 and 111 clockwise about rods 115 and 112 respectively, and thereby cams plate 108 clockwise against the tension of spring 108$^a$, bringing the lower edge of the plate directly over the ends of arms 106. This prevents the type bars associated with the item counter from being raised in these columnar positions. As the carriage is tabulated out of these positions, the parts restore to their normal positions shown in Figure 9, under the tension of spring 108$^a$.

8. Automatic entry of "1" in item counter

The units order rack 28 of the item counter A, unlike the units order racks of the B, C and D registers, is provided with a bell crank 29 (Figure 5) to yieldingly maintain this rack one step of movement below the lower guide block 31. This bell crank 29 is pivoted on a shaft 119 and is tensioned counter-clockwise by a spring 120. A lug 122, turned on the lower end of the vertical arm of bell crank 29, engages the rear edge of a notch 123 provided in a horizontal arm 124 of a slide 125. When lug 122 is so engaged, it causes a lug 121, turned on the horizontal arm of the bell crank, to prevent upward movement of rack 28 under the tension of spring 26, as shown in Figure 5. Slide 125 is mounted beside rack 28 for sliding movement within the guide blocks 31. A weak spring 126 tensions the slide downwardly, normally holding a shoulder on the lower edge of arm 124 against the upper guide block 31. An upstanding arm 126$^a$ is pivoted on shaft 56 of the item counter adjacent a bell crank 127 also pivoted thereon. A spring 128 connected between arm 126$^a$ and the vertical arm of bell crank 127 tensions 127 against a pin 129 secured in arm 126$^a$. The lower arm of bell crank 127 extends forwardly in the machine and lies within a slot in a stud 130, secured to the machine frame. The forward end of this arm carries a round shoulder 131 lying beneath the lower edge of arm 124 of slide 125. An upstanding finger 134 formed on the forward end of arm 124 lies directly beneath a movable detent indicated generally at 135. The upper end of arm 126$^a$ has pivoted thereto a hook 132 arranged to engage depending lugs 136 mounted on the traveling carriage. The rear end of hook 132 is retained in its upper position by a spring 133 connected between the forward end of the hook and lever 126$^a$. When detent 135 is removed from over finger 134 and the hook 132 is engaged in back of lug 136, moving of the item counter into engagement with the racks 28 during an operation causes arm 126$^a$ and bell crank 127 to pivot clockwise slightly about counter shaft 56 as it moves forward, whereupon shoulder 131 raises slide 125 against the tension of spring 126 and thereby removes notch 123 from engagement with lug 122. This permits bell crank 29 to swing counter-clockwise about rod 119 under tension of spring 120, allowing rack 28 to rise one step under the tension of spring 26, shoulder 30 striking the lower guide block 31 to limit the movement. This movement rotates the units pinion one step to add "1" in the item counter.

The bell crank 29 is arranged to be reset during the next operation by the same mechanism that is used to reset the similar bell cranks associated with the transfer mechanism of the other racks 28, and may be briefly described as follows.

A plate 138 pivoted at 139 and having a rod 140 extending along its lower edge, is moved clockwise about its pivot shortly after the beginning of each cycle of the machine. A link 141 has an upstanding projection 142 and is pivoted at its rear end to an arm 143 secured on one end of shaft 119. Another arm (not shown), similar to arm 143, is secured to the other end of shaft 119. A rod 144 is secured at its ends between the two arms to swing therewith. A spring 145 tensions rod 144 toward the rear of the machine.

The above-mentioned clockwise movement of plate 138 causes rod 140 to contact the projection 142 and move link 141 forward. This swings rod 144 toward the front of the machine and rotates, clockwise, bell crank 29 and any of the similar bell cranks that were tripped for the purpose of transferring during the preceding operation. This clockwise movement of the bell cranks resets the racks 28 to their initial position and allows slide 125 to drop to normal position. The parts are now ready for amount entering during the latter portion of the cycle. This resetting mechanism is fully disclosed in application Serial No. 581,800.

9. Keyboard control of entry of "1" in item counter

Means is provided under the control of the amount keys 1 whereby, when an amount is indexed by these keys, the detent 135, which controls slide 125, is moved to a position where it will not prevent slide 125 from rising, and thereby allow "1" to be added in the item counter.

Figure 8:
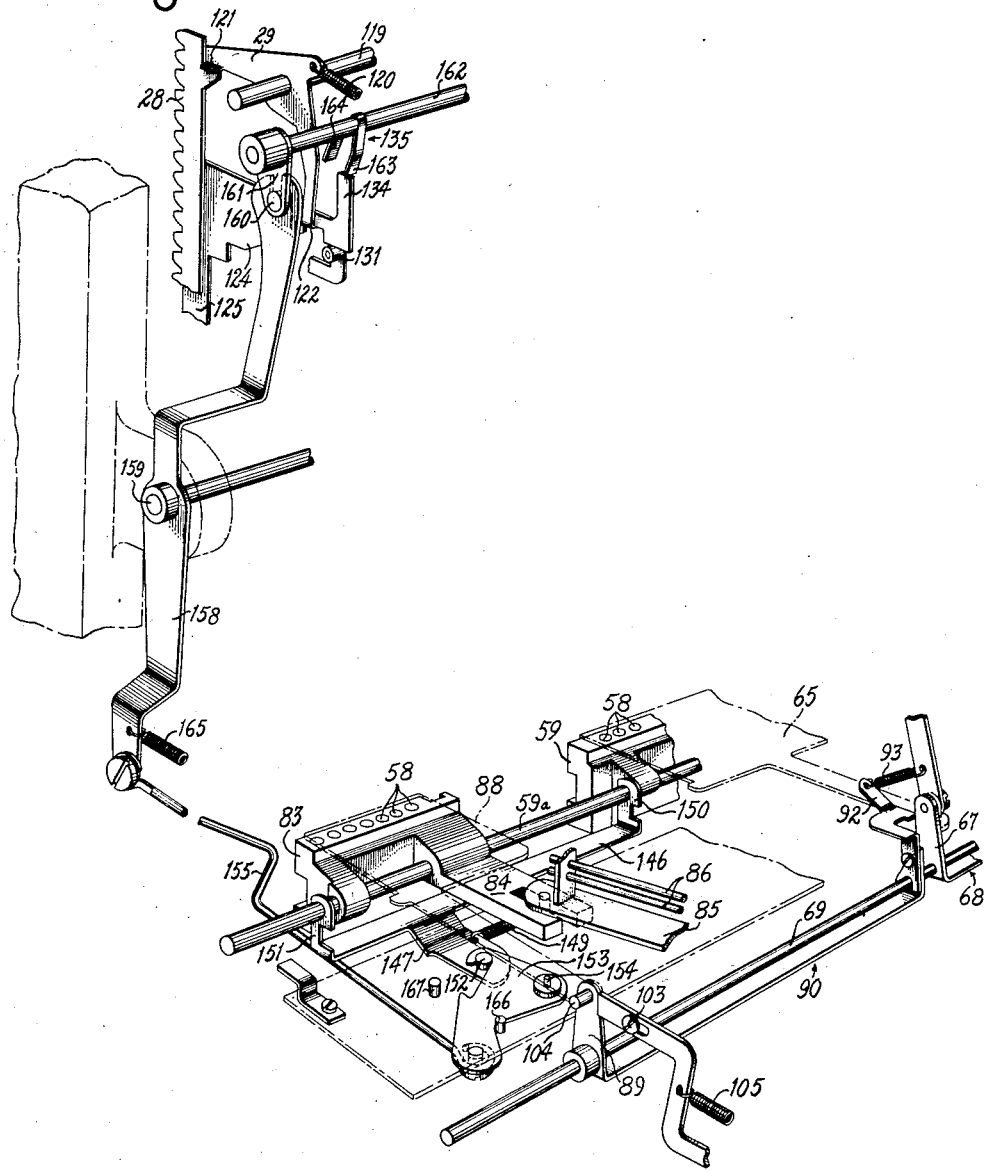

This means includes a transversely slidable bail 146 (Figure 8) mounted for sliding movement on rod 59a and having a forwardly extending projection 147. A spring 149, secured at one end to projection 147 and at its opposite end to the machine frame, tensions the bail toward the right, as viewed in Figure 8, and thereby causes an upstanding arm 150 on the right end thereof to bear against slide 59. With slide 59 in its extreme left, or normal position (with no figures indexed in the right keyboard), an upstanding arm 151 on the left end of bail 146 lies a short distance to the left of slide 83. A stud 152 secured on the upper side of projection 147 is engaged by a hook 153 pivoted at 154 on the machine frame. The forward end of this hook has pivoted thereto a rearwardly extending link 155, the opposite end of which is pivoted to the lower end of a lever 158. Lever 158 is mounted intermediate its ends for rocking movement upon a shaft 159 secured in the machine frame. The upper end of this lever is connected by pin and slot connection 160 to a downwardly extending arm 161 secured on one end of a shaft 162 pivoted in the machine frame. The detent 135 comprises a flat strip of metal formed with two legs 163 and 164 lying on opposite sides of the shaft and rigidly secured thereto. A spring 165 inferior to spring 149, connected between the lower end of lever 158 and the machine frame, normally tensions the lever counterclockwise of shaft 159 and holds hook 153 in engagement with stud 152. A pin 166 secured in the machine frame limits the counter-clockwise movement of hook 153 under tension of spring 165. With no digit indexed in the amount keys 1, leg 163 of detent 135 lies directly over finger 134 of slide 125, as shown in Figures 5 and 8, and thereby prevents the upward movement of slide 125 necessary to add the "1" in the item counter when the machine is cycled. Indexing of the first digit of a number by amount keys 1 moves the slide 59 one step toward the right, whereupon bail 146 moves to the right under tension of spring 149 until arm 151 thereof is stopped against slide 83 of the left keyboard. Such movement swings hook 153 about pivot 154, away from pin 166, and thrusts link 155 rearwardly. This rocks lever 158 clockwise on shaft 159 against the tension of spring 165 and rocks shaft 162 counter-clockwise a sufficient distance to withdraw leg 163 from above finger 134, as shown in Figure 6. In this position finger 134 is free to rise upwardly to allow the addition of "1" in the item counter. During the latter part of the cycle, slide 59 is restored to its normal position shown in Figures 8 and 10, such restoring movement causing the above-mentioned parts to be restored to their normal positions shown in Figure 8.

*10. Disabling the automatic entry of "1" when a number is entered in the item counter by amount keys*

When the operator indexes the total value of a group of items by the amount keys 1, and the number of items in the group by the amount keys 2, it is necessary that the consecutive number entering mechanism be rendered ineffective. To do this, the following mechanism is provided.

Indexing the total value of the items by amount keys 1 causes slide 59, bail 146, hook 153, link 155, lever 158 and detent 135 to move one step, as described above, to bring detent 135 from the position shown in Figure 5 to the position shown in Figure 6, it being remembered that the movement of bail 146 to the right was stopped by arm 151 striking slide 83. However, when the number of items in the group is indexed by amount keys 2, slide 83 is moved to the right, the indexing of the first digit of the number being sufficient to allow spring 149 to move bail 146 an additional step to the right, at which point hook 153 strikes a stationary pin 167. Such further movement of bail 146 and hook 153 is sufficient to move leg 164 of detent 135 directly above finger 134 of slide 125, as shown in Figure 7. This prevents the entering of "1" in the item counter during this operation. Restoration of slides 59 and 83 during the latter part of the cycle restores the parts to the position shown in Figure 8.

*11. Carriage control of entry of "1" in item counter*

The automatic entry of "1" in the item counter for items indexed by the amount keys 1 is also controlled by tabulation of the paper carriage by the following mechanism. The lugs 136 which coact with the hook 132 are secured to a horizontally disposed rod 168. This rod is mounted at its ends for sliding movement in depending brackets 169 (Figures 5 and 11) secured to the side plates of the carriage 4 at the rear of the machine. When the machine is operated with the carriage in a position where one of the lugs 136 lies in position to be engaged by hook 132, "1" is entered in the item counter in the manner above described. However, when the machine is operated with the carriage in a position where none of the lugs 136 are in position to be engaged by hook 132, movement of the item counter wheels 9 into mesh with racks 28 does not cause arm 126a and bell crank 127 to pivot about counter shaft 56 as it moves forward, as before, to raise slide 125, but instead merely carries arm 126a and bell crank 127 forward in the machine, causing shoulder 131 on bell crank 127 to slide horizontally forward along the lower edge of arm 124. In this manner "1" can be added into the item counter only in the columnar positions where one of the lugs 136 stops in position to be engaged by pawl 132.

Under certain conditions hook 132 is in its forward position while the carriage is tabulating, making it necessary to bevel the edges of lugs 136, as shown at 170 (Figure 11). With this construction, tabulation of the carriage does not damage hook 132 but merely turns it clockwise about its pivot 137 against the tension of spring 133, as shown in Figure 3. At the beginning of the next machine cycle, disengagement of the item counter pinions 9 from their actuating racks 28 moves hook 132 to the right (Figure 5) where spring 133 returns it to its normal position shown in this figure.

It will be observed that means must be provided to permit the arm 126a and bell crank 127 to flex relatively when the carriage occupies a position wherein a lug 136 is in position to be engaged with hook 132, and either of the legs 163 or 164 of detent 135 are positioned over finger 134 of slide 125. This means, previously described, comprises the spring connection 128 between arm 126a and bell crank 127. Referring to Figure 5, if the item counter is brought into engagement with the racks 28 under these conditions (as shown in Figure 5), clockwise pivotal movement of arm 126a about counter shaft 56 causes the vertical arm of bell crank 127 to be drawn away from pin 129 in arm 126a, stretching spring 128. During such operations shoulder 131 of bell crank 127 moves forwardly horizontally along the lower edge of arm 124.

12. Counting checks or deposits selectively

The rod 168 is adjustable transversely of the paper carriage to three positions for check counting, non-counting, and deposit counting. Referring to Figure 11, the lower edge of the left end of rod 168 is provided with three spaced notches 171, 172 and 173 corresponding to the above positions. A spring detent 174 secured to one of the brackets 169 is arranged to engage these notches. The extreme left end of the rod is provided with a knob to permit the operator to readily shift the rod transversely into any one of these three positions. An indicator 175 (Figures 11 and 12) secured to the rod indicates on a stationary index plate 176 secured to the side wall of the carriage, which of the three positions the rod occupies. When the rod is in the position shown in Figure 11, with detent 174 engaging notch 171, the two lugs 136 that coact with hook 132 to count checks, lie in such positions along rod 168 that they are effective when the carriage is tabulated to either "check" column. When rod 168 is in this position, lug 136 for deposits is ineffective when the carriage is tabulated to the "deposit" column. When the rod 168 is shifted from this position to its intermediate position where detent 174 engages notch 172, lugs 136 all lie in such positions along rod 168 that they are ineffective in all columnar positions of the carriage. When the rod 168 is moved to its third position, i. e. with detent 174 engaging notch 173, lug 136 for deposits is effective when the carriage is tabulated to the "deposit" column, and the two lugs 136 for checks are ineffective when the carriage is tabulated to the "check" columns. Hence, transverse adjustment of rod 168 with respect to the carriage provides an easy and efficient means for selectively controlling the class of entries which are to be counted during a series of machine operations.

13. Non-printing item count

A non-print plate 178 (Figure 3) is arranged to prevent the printing of entries made in the item counter. The plate has a downwardly turned flange 180 along its rear edge and is pivoted on a stationary rod 179. A link 181, pivoted at its upper end to the plate, extends rearwardly and engages a depending arm of a lever 182. The lever is pivoted on stationary rod 115 and a rearwardly extending arm thereof extends under a pin 184 guided for vertical movement in the machine frame. Pin 184 is arranged to be depressed, indirectly, by magazine lugs such as 117. A spring 183 secured to lever 181 and to the machine frame normally tensions the lever rearwardly and maintains the associated parts in the position shown in Figure 3. Lugs such as 117 placed in the magazines 6 for the "check" and "deposit" columnar positions, are arranged to depress pin 184 when the carriage tabulates to these positions. Such depression of pin 184 rocks lever 182 clockwise and thrusts link 181 forward against the tension of spring 183. This forward movement of link 181 rocks plate 178 downwardly and thereby lowers flange 180 into the path of the hammers 65 associated with the item counter type bars 13, to prevent them from striking the type to print the number entered in the counter.

14. Examples of work

The statement and ledger forms shown in Figures 13 and 14, respectively, illustrate how both checks and deposits of patrons' accounts may be counted when an institution makes what is known as a dual installation of machines. In such instances, one of the machines upon which the statement forms are to be posted is adjusted to count checks drawn on the patron's account. The other machine upon which the ledger forms are to be posted is adjusted to count deposits entered on the same patron's account. It will be understood from the foregoing that where one machine only is used, that machine may be set to count either checks or deposits according to the election of the particular user.

Statement form—Counting checks

With the machine adjusted for counting checks, the operator inserts the statement form (Figure 13) in the machine in front of a proof sheet, a portion of the latter extending beyond the left edge of the statement. The old balance of "2,454.65" from the previous month's statement is entered in the machine and printed on the first line of the proof sheet. The carriage is then tabulated to the first "check" column of the statement form. Here the amount "1,225.36" of the first check is entered and printed. Simultaneously, "1" is added in the item counter and non-printed. The carriage then tabulates to the second "check" column where the amount "320.32" of the second check is entered and printed, and simultaneously therewith "1" is added in the item counter and non-printed as before. The carriage then tabulates to the "deposit" column where the amount of the deposits "1,129.85" for this day are entered and printed. The carriage then tabulates a short distance where a blank cycle is taken, and again tabulates to bring it to the first "balance" column. In this position the computed new balance "2,038.82" is sub-totaled and printed, together with the date "June 16 37" and the sub-total "2" representing the number of checks posted. The carriage then advances to the second "balance" column where the date, total of the number of checks and new balance are printed upon the stub of the statement. The carriage then returns from this position to its starting position for the insertion of the next form upon which postings are to be made for this day. On a subsequent day such as "June 18 37" when further entries are to be made upon "John Doe's" statement shown in Figure 13, this form is again inserted in the machine with line 2 thereof placed in printing position with respect to platen 7. The total number of checks "2" is indexed by amount keys 2 and the old balance "2,038.82" indexed by amount keys 1 so that these figures may be accumulated and printed upon the proof sheet. The carriage then tabulates to the first "check" column. Since the number of checks to be entered on this day are, say, "5", the operator adds the checks on an adding machine and indexes this amount "1,827.15" by amount keys 1 and indexes "5", the number of checks, by amount keys 2. The machine is then cycled and the amount "1,827.15" is printed in the first "check" column, and the "5" is added in the item counter simultaneously, but non-printed as explained above. The carriage then tabulates to the "deposit" column where the amount of the deposit "908.50" is entered and printed, and the carriage tabulates to the first "balance" column where the date "June 18 37," sub-total of the number of checks, "7" (the "5" having been added to the previous "2"), and the sub-total of the new balance "1,120.17" are printed. The carriage then advances to the second "balance" column where the date is again printed, together with the totals of the number of checks and the new balance, and then returns to starting position ready for the next form. When it is desired to make further postings upon this form at a later date, say "June 23 37," the statement is again inserted and posted in the above manner.

*Ledger form—Counting deposits*

Referring to Figure 14, with the second machine adjusted to count deposits, the operator inserts the ledger sheet in the machine directly in front of a proof sheet similar to that used with the statement form. The amount of the old balance "2,454.65" is entered and printed upon the proof sheet and the carriage tabulated successively to the first and second "check" columns where the amounts "1,225.36" and "320.32" are printed in the same manner as described in connection with the statement form. Following this, the carriage tabulates to the "deposit" columnar position. Since the deposit amount "1,129.85" represents two deposit entries, this amount is indexed by amount keys 1, and the number of deposits, "2", is indexed by amount keys 2. Hence, as the machine is cycled, the amount "1,129.85" is printed in this column and the "2" is entered in the item counter but is non-printed. The carriage then advances to the "new balance" column where the date "June 16 37," total of deposits made "2" and the new balance "2,038.82" are printed. Following this operation, the carriage is returned to starting position ready for the insertion of the ledger sheet of the next patron. At a later date such as "June 18 37" "John Doe's" ledger sheet is again inserted in the carriage and the total amount "2" of the deposits is indexed by amount keys 2 while the old balance amount of "2,038.82" is indexed by amount keys 1. These amounts are then simultaneously printed upon the second line of the proof sheet. The carriage then advances to the second "check" column where the amount of "1,827.15" for the five checks is printed. The carriage then advances to the "deposit" column where the amount of a single deposit "908.50" is indexed by amount keys 1 and printed when the machine is cycled. Simultaneously with the entering of this amount, "1" is automatically added in the item counter, and the machine then tabulates to the "new balance" column where the date "June 18 37," the total "3" of the deposit entries up to this date, and the new balance of "1,120.17" are printed. The other postings shown in Figure 14 as made on later dates are made in the same manner.

The entries "17,842.59 DR," "16,530. CR" and "210,640.34 NB" at the bottom of Figures 13 and 14 represent register totals taken with lever 95 (Figure 4) in its forward position, where it is effective to prevent the printed register totals from being accompanied by printing from the type bars associated with the item counter.

While the form of mechanism herein shown and described is admirably adapted to fulfill the objects primarily stated, it is to be understood that it is not intended to confine the invention to the one form of embodiment herein disclosed, for it is susceptible of embodiment in various forms all coming within the scope of the claims which follow.

What is claimed is:

1. In a machine of the class described, an item counter, means for entering a unit in the item counter, means, including indexing mechanism for entering larger amounts in the item counter, and means, operated under control of the indexing mechanism, for disabling first the mentioned entering means.

2. In a machine of the class described, a totalizer, an item counter, indexing mechanism including amount keys for the totalizer, other indexing mechanism including amount keys for the item counter, normally ineffective means for advancing the item counter one step, means controlled by the first mentioned indexing mechanism for rendering the said normally ineffective means effective, and means controlled by the second mentioned indexing mechanism for thereafter rendering the said normally ineffective means again ineffective.

3. In a machine of the class described, an item counter, indexing mechanism including amount keys for entering numbers therein, other means for entering a unit in the item counter, and means controlled by the indexing mechanism for rendering the said other means ineffective when an amount is indexed thereby.

4. In a machine of the class described, a traveling carriage, an item counter, actuating means therefor, and adjustable means on the carriage for controlling the effectiveness of the counter actuating means, the said adjustable means being movable to one position where it renders operation of the counter actuating means effective when the carriage is in one columnar position, and being movable to another position where it renders operation of the counter actuating means effective when the carriage is in another columnar position, the adjustable means including a bar slidable for selective adjustment along the carriage, and having depending lugs rigidly secured thereto and spaced apart a distance different from the distance between their respective columns on the carriage, so that when one lug is aligned with its respective column the other lug is placed out of alignment and thereby rendered ineffective to control said counter actuating means.

WALTER A. ANDERSON.